United States Patent [19]

Patten et al.

[11] 4,065,747
[45] Dec. 27, 1977

[54] ACOUSTICAL UNDERWATER COMMUNICATION SYSTEM FOR COMMAND CONTROL AND DATA

[75] Inventors: Hudson Taylor Patten, Westlake Village; Floyd Baylie Woodcock, Oxnard, both of Calif.

[73] Assignee: Bunker Ramo Corporation, Oak Brook, Ill.

[21] Appl. No.: 636,033

[22] Filed: Nov. 28, 1975

[51] Int. Cl.² .......................................... H04B 11/00
[52] U.S. Cl. ............................. 340/5 R; 340/16 C; 340/148; 340/151; 340/152 T
[58] Field of Search ............... 340/5 R, 5 C, 16 C, 340/148, 151, 152 T, 3 A

[56] References Cited

U.S. PATENT DOCUMENTS

| 3,427,554 | 2/1969 | Lagoe et al. | 340/5 R |
|---|---|---|---|
| 3,622,962 | 11/1971 | Winget et al. | 340/5 R |
| 3,638,174 | 1/1972 | Haase et al. | 340/5 R |
| 3,717,844 | 2/1973 | Barret et al. | 340/5 R |
| 3,992,692 | 11/1976 | Filer | 340/5 R |

OTHER PUBLICATIONS

Fraser, *Undersea Technology,* May/June 1962, pp. 29-31.

*Primary Examiner*—Richard A. Farley
*Attorney, Agent, or Firm*—F. M. Arbuckle; A. Freilich

[57] ABSTRACT

An acoustic communication system is disclosed as a secondary means for command control of underwater operations from a surface unit. The system includes a diving acoustic command control unit for use in the event of prime propagation path occlusion. Self-check verification as well as data read-out upon interrogation is provided from the surface unit to an underwater receiver-transponder. The latter will also respond to acoustic command signals from the diving unit. An early warning blowout detector employs sensors at the wellhead to detect seismic waves, mud pressure wave fronts and mud flow rates resulting from an emerging blowout and in response thereto, transmits an alert signal.

23 Claims, 12 Drawing Figures

ACOUSTICAL UNDERWATER COMMUNICATION SYSTEM FOR COMMAND CONTROL AND DATA

BACKGROUND OF THE INVENTION

This invention relates to an acoustic underwater communication system, and more particularly to an apparatus for transmitting command or control signals to underwater equipment and for receiving data signals therefrom. The invention further relates to a system for detecting an event near the underwater equipment which may forecast an impending disaster, and to a back-up acoustic communications link in a vessel launched in an emergency to dive below any occluding disturbance in the water.

Mineral exploration, development and production equipment operating under water is currently being implemented with either hydraulic or electronic/hydraulic systems which require the use of either electrical cables or hydraulic pilot control cables, extending from the sea-floor structure to a remote control center which may be a drilling platform, a production platform or a centralized subsea control station which, in turn, is controlled remotely from either a surface platform or shore station. Since all of these systems depend upon maintaining the integrity of a "hard wire" in the water, there is increasing concern, both in the industry and in various regulatory agencies, that catastrophic failures may occur if this link parts for any reason, such as may result from a catastrophic blowout at a wellhead, heavy weather, inability of a platform to maintain station with a consequent drive-off, etc. An acoustic communication link that propagates valve control commands directly through the water would provide a method of maintaining control in the event of failure of the hard wire link. In the case of a failure in an oil producing operation (where there is no evidence of damage or leakage in the production flow lines) an acoustic link could be used to reopen the production valves which are currently designed to close automatically in the event of primary control failure, such as power loss, or a hydraulic control line parting.

Other examples of activities and operating conditions under which an acoustic communication link could be used to advantage will be evident. Consequently, it will be apparent that the present invention is not limited to exploration and production of oil. Reference to that type of activity serves merely to illustrate the importance of the invention, particularly in connection with a catastrophic gas blowout occurring during otherwise routine drilling operations. The magnitude and manner of the blowout would be such that primary system control (hydraulic or electrohydraulic, depending on hard-wire communication from the drilling platform to the wellhead structure) is either deliberately or inadvertently disconnected. The present invention would provide an acoustic link that could be used as a secondary command/control link with greater reliability than has heretofore been possible.

In the past, efforts have been made to use acoustic command/control links in underwater wellhead operations, as shown in U.S. Pat. No. 3,750,096. Briefly, valves positioned under water at a wellhead are controlled by coded acoustic transmissions generated at a control station on an offshore rig through an underwater transducer fastened to the rig and hard wired to the control station.

An acoustic communication system has been found to be advantageous not only in transmitting data relating to monitored parameters from underwater equipment to a control platform but also in providing an emergency or back-up link. It is desirable to obtain monitored data upon interrogation, and to be able to check or verify the operation of the underwater communication equipment upon interrogation by confirming critical signal path integrity without actually interrupting operation of equipment being monitored and/or controlled.

A major problem with prior acoustic communication systems is that, at the moment of greatest need, the communications link is very likely to be occluded by great turbulence in the water. If the acoustic transducer is attached to or suspended from the platform rig at a sufficiently great depth, this turbulence (which covers a greater area near the surface of the water in the event of a gas blowout) can be avoided, but this approach requires extending the hard-wire link from the surface over a greater length through the turbulence, thereby increasing the probability that the communications link will be broken through a parting of the hard-wire link. Alternatively, it has been suggested that the acoustic transducer be suspended from a small boat deployed a sufficiently great distance from the platform that a turbulence free communication path exists from the transducer to the underwater control apparatus. Such an approach is, however, unattractive because of the risk involved in launching a small boat, and the valuable time expended in deploying it the sufficient distance.

SUMMARY OF THE INVENTION

The present invention is directed to a system for reliable communication with an underwater control apparatus in the shortest possible time without a hard-wire link. Although the invention is particularly useful in oil drilling systems, it surely is not limited to such applications and can find widespread utility in other systems.

In accordance with an important feature of the invention a diving acoustic transmission unit is provided which is self-powered and which can be released from a surface platform to dive toward the underwater control apparatus.

An acoustic communication system in accordance with a preferred embodiment of the invention employs surface means for transmitting and receiving encoded acoustic communications signals and an underwater means for receiving coded communications and initiating operations called for by each communication. The operations may include acknowledgement and tests to confirm the operational integrity of a receiver control unit before actually initiating the commanded operations.

A diving acoustic transmission means is provided which is self powered and contained within a vessel adapted to be free diving once it is launched into the water. Upon entering the water, it will begin transmitting a preprogrammed communication which may be comprised of an arming code followed by one or more functional command codes. An acoustic transducer at one end of the vessel projects the coded communication in the form of acoustic waves which propagate in all directions. A weight is preferably connected to that one end of the vessel by a coiled line which pulls down the vessel with the transducer end pointing downwardly. To assure this attitude of the vessel as it descends, buoyant material is included in its other end. Once the weight is resting on the bottom, the vessel will float above it tethered by the line. In that manner the acoustic transducer remains free of occluding soil or plants at the bottom while it continues to repeat the coded communication until the battery power has been expended.

Detecting an event near underwater equipment which may forecast an impending disaster, such as a blow out in a well drilling operation, is provided by means for detecting at least one of a plurality of parameters of the event and generating an event detection signal in response to signals from such detecting means. Where more than one detecting means is employed, the reliability of detecting an alarm condition is improved by further means for determining that the alarm condition signal from each sensing means occurs within a predetermined time interval (of less than about 3 seconds). After all of the imposed tests have been satisfied, the transmitting means is triggered to transmit an alarm code. Once an alarm code has been received, an appropriate command is transmitted to a control system at the wellhead, either through a primary hard-wire link or a secondary acoustic link to actuate apparatus that will prevent a blowout from the well head.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
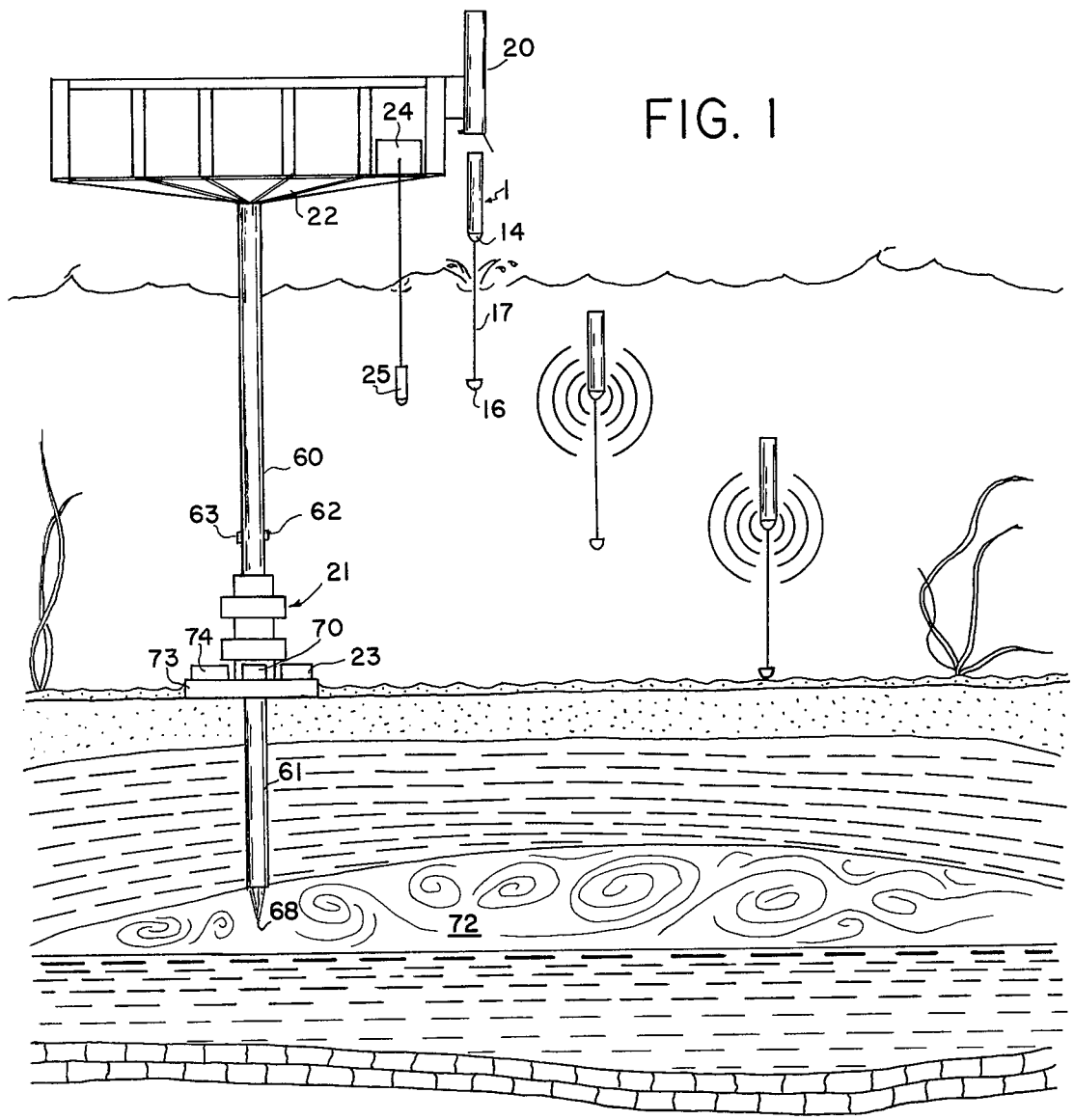
FIG. 1 is a schematic diagram illustrating apparatus of the present invention in place in a well drilling system.
Figure 2:
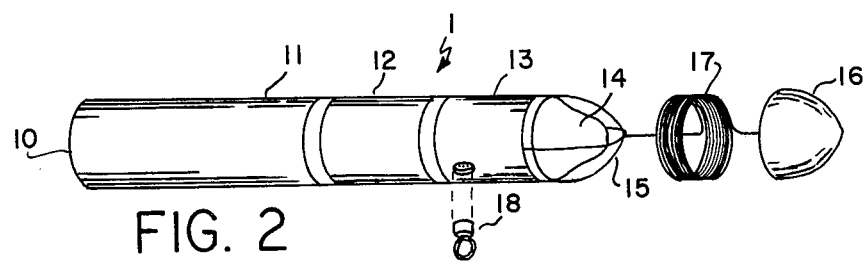
FIG. 2 is an isometric view, partly exploded, of the present invention.

The following description of preferred embodiments is in relation to an underwater oil drilling operation shown schematically in FIG. 1, and will begin with a description of an expendable, quickly launched, emergency or back-up link 1 shown in FIG. 2 from the command/control communication system of FIG. 1. However, the communication system of the present invention is not limited to oil drilling operations and the concept of a diving back-up link, as well as other features of the communication system disclosed herein may be used in other types of underwater operations.

Referring now to FIG. 2 of the drawings, an improved emergency or back-up link for control of underwater equiment includes an expendable acoustic transmission unit comprised of a housing or vessel 10. In size, shape, and design, the vessel may be very similar to a standard ASW (antisubmarine warfare) sonobuoy. It may be 5 inches in diameter and about 48 inches long. A rear section 11 is made of syntactic foam for buoyancy. A central portion 12 houses suitable batteries, which may be of the conventional nickel-cadmium type. Alternatively, conventional sea water activated batteries of silver chloride or of the type disclosed in U.S. application Ser. No. 595,586 filed July 14, 1975, can be used.

Forward of the battery compartment 12 is an electronic section 13 which will generate a communication that may consist of an arming code followed by one or more command codes to be transmitted acoustically through a transducer 14. A wire frame 15 affixed to the unit over the transducer 14 is connected to a dead weight anchor 16 by a coiled stainless steel wire 17 (which uncoils quickly once the unit is launched) to pull the unit down through the water and to hold the unit floating above the bottom a suitable distance, for example 20 feet, as shown in FIG. 1.

Before launching the diving back-up link 1, a pin 18 is pulled from the vessel 10 to arm its electronic section. Then a launch tube 20 (FIG. 1) releases the vessel 10 so that it free falls into the water, thereafter repeatedly transmitting arming and command codes until the end of the battery life (about 600 seconds). Actual energization of the transmitter substantially concurrently with the launch can be effected in several suitable ways such as by an electromechanical mechanism actuated by a lanyard or by water activated mechanism. If used in connection with a blowout preventer (BOP) stack 21 (in the event an eruption of a gas blowout so disrupts the water that an acoustic path between the BOP stack and a drilling platform 22 is occluded), the diving unit will at some point pass through the cone of disruption and find an unoccluded acoustic transmission path to an underwater receiver-transponder 23 which would be mounted on either a BOP stack for drilling operations or a subsea completion christmas tree for production operations.

The diving unit thus far described is not, of course, limited to use with a BOP stack. It can be used in any situation where it is necessary, or desirable, to use acoustic transmission from a point below any occluding disruptions in the water.

The diving unit can be dedicated to any system by simply programming the codes to be transmitted according to the needs of the particular application. For example, a programmable read-only (PROM) memory may be used to store the codes in a fixed sequence. A counter driven by memory cycle clock pulses then repeatedly and sequentially addresses the PROM code locations, each code being read out in parallel in a shift register for transmission serially bit by bit. The shift register would be driven by system clock pulses at a sufficiently higher rate than the memory cycle clock pulses. In practice, the memory cycle clock pulses would be derived from the system clock pulses in a conventional manner for a synchronous system.

The receiver-transponder 23 performs the following functions:

1. Receive and acknowledge coded acoustic arming signals, which would enable it to receive control commands.

2. Receive and acknowledge coded acoustic commands to initiate operation of either BOP or SSP functions, i.e., ram closures or valve openings.

3. Upon receipt of a unique command, the unit switches into a test mode that permits confirmation of the operational integrity of all actuate command signal paths within the receive control unit in response to actuate commands without actually initiating the commanded actuations;

4. While still in the test mode, the unit transmits encoded acoustic data signals in response to a data interrogate command.

Normal communications with the receiver-transponder 23 is from a platform control unit 24 which is preferably a completely self-contained signal encoder, transmitter-receiver, and data read-out system enclosed within a rugedized portable, splash proof package. This unit preferably operates off both available platform line voltages and an internal rechargeable supply. It provides sufficient amplification of generated commands to drive an acoustic projector 25 hard wired to it and suspended at shallow depth in the water below the drilling platform. An additional projector-cable combination could be provided with this unit to permit portable operation remotely from the platform if required.

Figure 3:
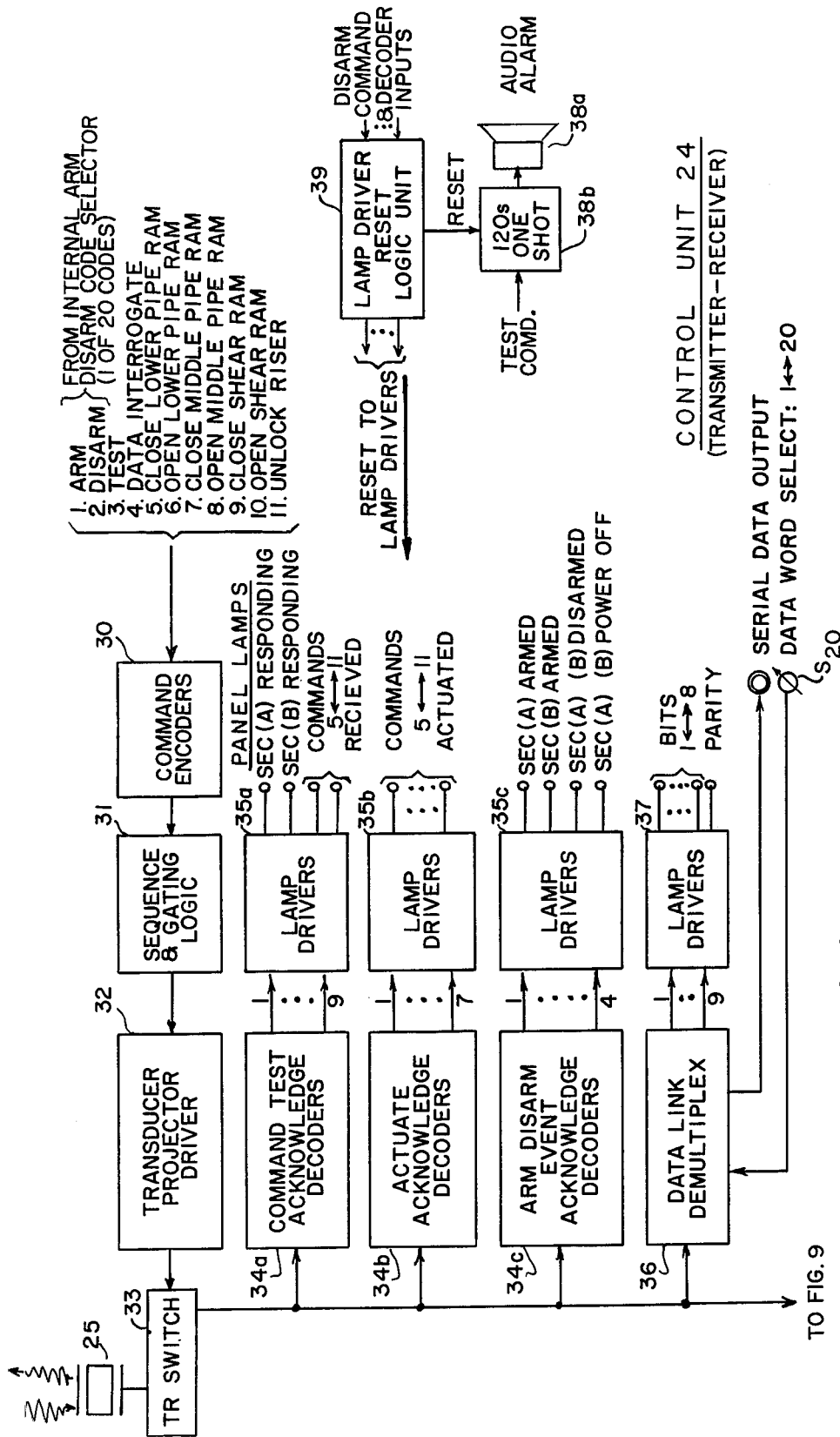
FIG. 3 is a block diagram of a platform control unit for use when the diving unit of FIG. 2 is not being used.

FIG. 3 illustrates a block diagram of the platform control unit 24. This unit is capable of generating and transmitting a plurality of command (test, actuate, and arm-disarm) functions via command encoders 30. Illustrative functions are shown for a wellhead control BOP stack. Sequence and gating logic 31 transmits to a transducer projector driver 32 the selected arm/disarm test, and other command codes in the proper order. A transmit/receive (TR) switch 33 couples the driver 32 to the acoustic transducer projector 25 (FIG. 1) suspended in the water.

When the receiver-transponder 23 (FIG. 1) at the well-head receives a function (arm, test, data interrogate, actuate or disarm) code, it acknowledges by transmitting a unique code or data. Decoders 34a, 34b, and 34c in the control unit (FIG. 3) decode the different ones of the acknowledgement codes, each being capable of decoding a number of different codes, and through lamp drivers 35a, 35b and 35c, indicating on panel lamps the acknowledgements. For transmission of data, there is provided a data link demultiplexer 36 which displays data as received via lamp drivers 37 and provides serial data output with a capability of selecting one of 20 data words from any of 20 specified low-rate wellhead sensors.

The arm command code causes one or two underwater units to switch to a mode under which it will respond to test and actuate codes, and the disarm command code disables the armed unit(s). The test command code permits testing, without actuation, of all critical decoding circuit paths within the underwater unit. In order to conserve power in the tested unit, an audio alarm 38a will alert the operator when a 120-second one-shot 38b times out after transmission of a test command, reminding him to disarm the underwater unit. A lamp driver reset logic unit 39 will reset the one-shot after a test command when the disarm command is entered into the command encoder. The unit 39 also functions to reset lamp drivers as required in response to decoder inputs.

Figure 4:
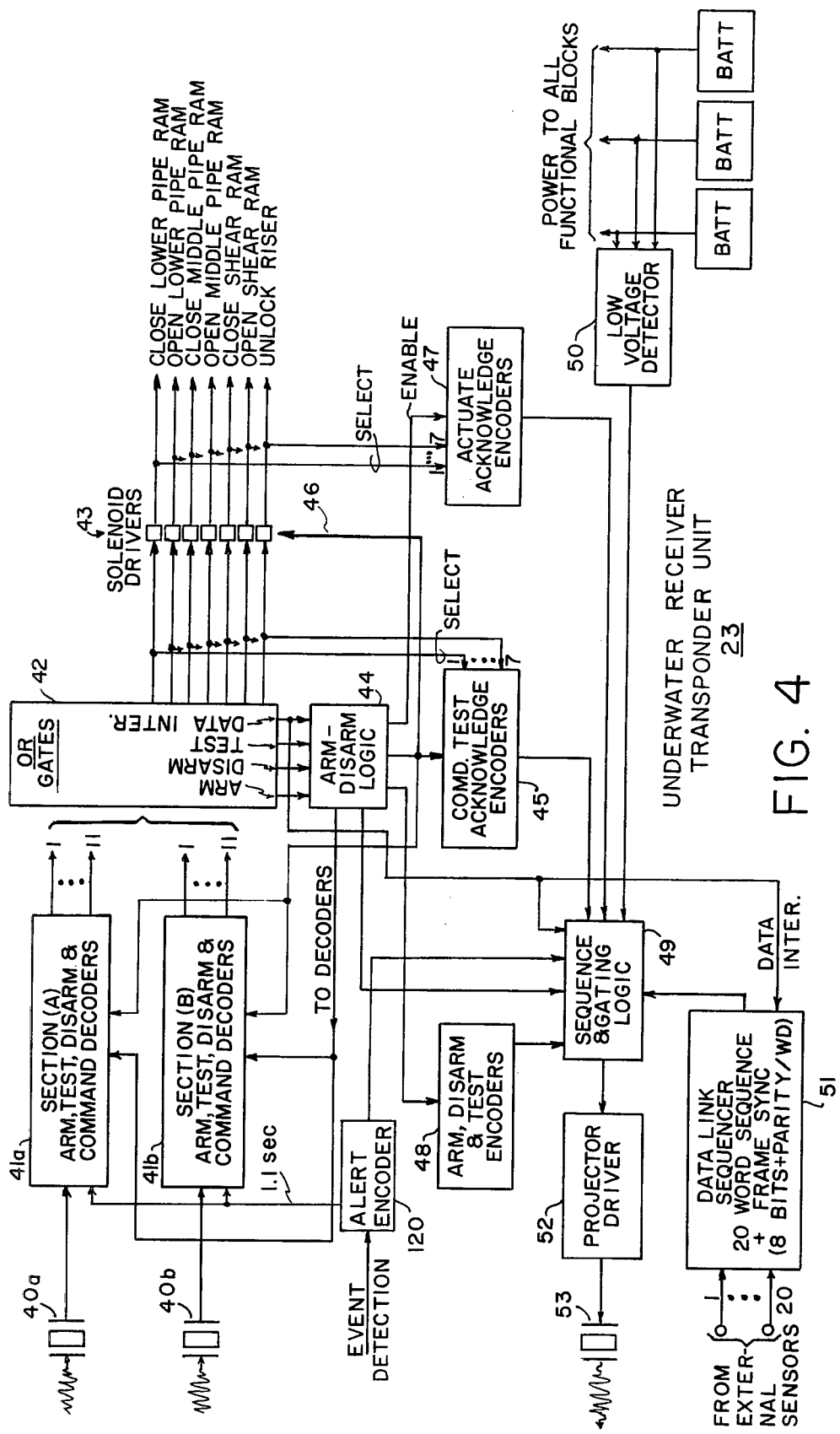
FIG. 4 is a block diagram of a command receiver-transponder for underwater equiment shown in FIG. 1.

A block diagram for the underwater receiver-transponder unit 23 is shown in FIG. 4. In practice, the underwater unit is totally self-contained except for the transducers within a sealed pressure vessel with fully redundant acoustic receiving paths to enhance reliability. Electronic power is provided by sealed lead-acid batteries packaged in the pressure vessel.

Separate receiving transducers 40a and 40b are provided for two separate and redundant decoders 41a and 41b. Redundancy is extended beyond the transducers to include fully redundant decoding of all commands. The redundant decoders are identified as sections A and B solely for separate arming and testing through the platform control unit. OR gates represented by a block 42 combine the outputs of the two sections in the underwater unit such that proper operation of either will energize the appropriate one of a bank of solenoid drivers 43, or will energize arm-disarm logic 44. The solenoid energizing outputs from the OR gates select command test acknowledge encoders 45 enabled by the logic 44 while the arm-disarm logic disables the solenoid drivers 43 via a line 46 during the execution of a test command. When not testing, the energization of a solenoid driver selects one of several actuate acknowledge encoders 47 enabled by the logic 44. Arm, disarm and test commands are acknowledged by the arm-disarm logic 44 via encoders 48.

The arm-disarm logic 44 starts and stops a sequence and gating logic unit 49 for selectively transmitting codes from the encoders 45, 47 and 48, or from a sequencer 51 which assembles a 20 word sequence plus a frame sync word to transmit data from 20 external sensors. A low-voltage detector 50 continually monitors the power supply batteries and causes an appropriate code to be transmitted on a periodic basis when voltage is low. A projector driver 52 transmits through a transducer 53 from the encoders or the data sequencer as determined by the sequence and gating logic 49.

Figure 5:
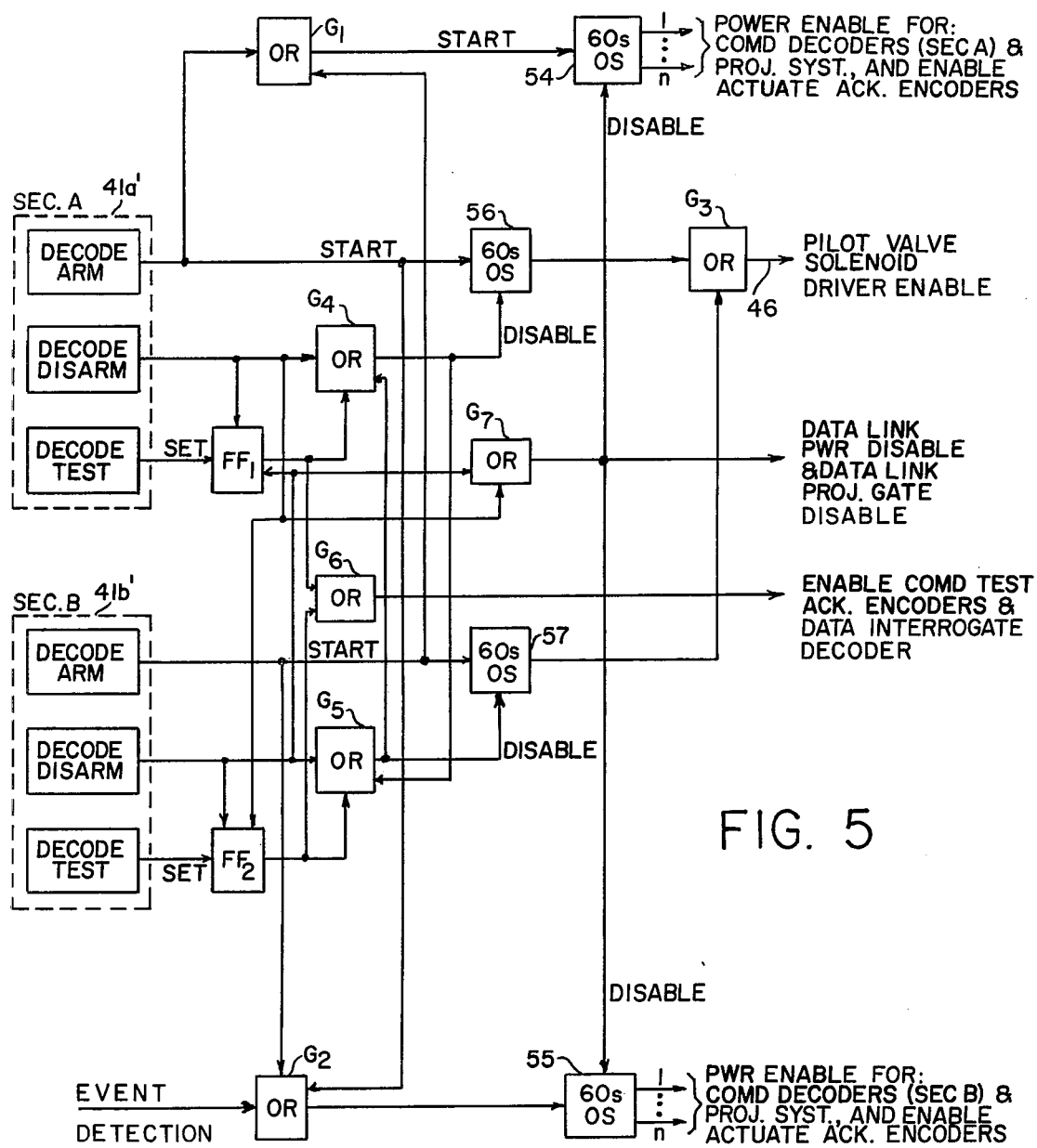
FIG. 5 is a logic diagram of a preferred implementation of a portion of the system of FIG. 4.

An exemplary implementation of the block 44 is shown in FIG. 5 where the separate decoders in sections A and B for arm, disarm and test are set forth in dashed line blocks 41a' and 41b'. Decoding an arm command in either section triggers 60-second timers 54 and 55 via OR-gates $G_1$ and $G_2$ to turn power on to command decoders in both decoder sections 41a and 41b (FIG. 4), enable actuate acknowledge encoders 47 (FIG. 4) and enable the system for transmitting through the projector driver 53 (FIG. 4). Triggering either of the two 60-second interval timers 54 and 55 provides a window during which decoding circuits will be powered to receive actuate or test commands. At the end of the 60-second interval, the unit will automatically return to a passive state where only the arm decoder will be powered.

If an arm command is decoded in section A, a 60-second timer 56 is triggered to enable a pilot valve solenoid drivers via an OR gate $G_3$ for any actuation that may be required by a following command. Similarly, an arm command decoded in section B triggers a 60-second timer 57 to enable the same pilot valve solenoid drivers via the OR gate $G_3$.

Upon receipt of a test command, the unit will be disarmed by disabling (resetting) interval timers 56 and 57 via flip-flops $FF_1$ and $FF_2$ and OR gates $G_4$ and $G_5$ to preclude inadvertantly operating a solenoid driver during a test sequence. Although all command decoders (other than arm and disarm) will be automatically depowered after 60 seconds, in the test mode the flip-flops FF$_1$ and FF$_2$ will remain set until receipt of a disarm command. Thus when a test command is decoded in section A, it sets flip-flop FF$_1$ which disables the timer 56 via OR gate G$_4$ so as to disable the pilot valve solenoid drivers over line 46. Similarly, a test command decoded in section B sets flip-flop FF$_2$ for the purpose of disabling the timer 57 via OR gate G$_5$ and disabling the solenoid drivers. A test command decoded in either section A or section B will disable both timers 56 and 57 as outputs of gates G$_4$ and G$_5$ are cross connected. A disarm code decoded in either setion A or B will reset the flip-flops FF$_1$ and FF$_2$. While set, either flip-flop will enable command test acknowledgement enconder 45 (FIG. 4) via an OR gate G$_6$.

In order to conserve power in the test unit, an audio alarm in the platform control unit will alert the operator 120 seconds after transmission of a test command, as noted hereinbefore, reminding him to disarm the underwater transmitter-responder.

A disarm code decoded in either section A or B will disable data link power via OR gate G$_7$. It will also disable a gate in logic 49 (FIG. 4) to the projector driver from the data link sequencer 51 (FIG. 4). A disarm code thus effectively shuts down the underwater unit. However, before doing so, the disarm code is acknowledged. In the preferred embodiment illustrated in FIG. 4, that is done by the appropriate one of the encoders 48 via the sequence and gating logic 49 before the data link power disable becomes effective.

The system thus far described is a secondary command control system to be used only when a hard-wire communication link fails, and to periodically check to see that the primary hard-wire link is transmitting data properly from external sensors. To accomplish that, the secondary acoustic command control system may be periodically interrogated and the data thus received from the external sensors compared with that received over the hard-wire link.

To interrogate the back-up system for sensor data, the arm code is first transmitted, then the test code is transmitted. This places the back-up system in the test mode. However, instead of following the test code with a command test code (acknowledged by one of the encoders 47 (FIG. 4) selected by the command code), it is followed with a data interrogate code. Once the test code is received and decoded, it enables data interrogate decoders (via OR gate G$_6$ FIG. 5) in both sections 41$a$ and 41$b$ of the command decoders. Then when the data interrogate command is received, it is decoded. The output of the data interrogate decoders are combined by one of the OR gates 42 (FIG. 4) to transmit a data interrogate signal to the data link sequencer 51 and to the sequence and gating logic 49. That enables the data link sequencer to cyclically transmit a 20 word sequence plus a frame sync word.

There are eight bits plus a parity bit per sensor data word transmitted. The sequence and gating logic sequences the 20 words and gates them to the projector driver 52 (FIG. 5). The control unit 24 (FIG. 4) demultiplexes the sequence to permit a selected sensor to be read out serially by bit. As many sensor data words may be selected as desired, one at a time, through a rotary (thumb wheel) switch S$_{20}$. The selected word (eight bits) plus the parity bit are displayed through lamp drivers 37. Once all the data words desired have been selected and read out, a disarm code is transmitted.

During a data interrogate time, actuate test commands are not transmitted because the transducer 25 (FIG. 3) is actively engaged in receiving acoustic signals. When the test mode is to be used for testing purposes, the test command is followed by selected command tests which are acknowledged through encoders 45 (FIG. 4) while solenoids 43 are disabled as described hereinbefore. The command test acknowledge encoders then switch the sequence and gating logic to transmit the acknowledgment.

Figure 6:
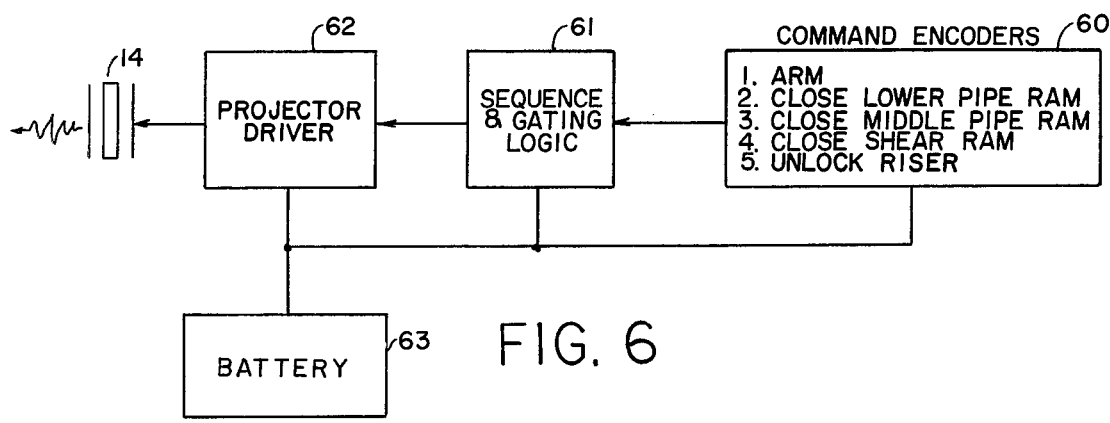
FIG. 6 is a block diagram of the diving unit of FIG. 2.

The expendable back-up link 1 shown in FIG. 2 is implemented, as shown in FIG. 6, by a bank 60 of five command encoders which are preset to generate appropriate commands, such as: arm; close lower pipe ram; close middle pipe ram; close shear ram; and unlock riser; all of which are commands associated with equipment of the BOP stack at the wellhead. These are, however, merely examples since any other set of commands for any other equipment may be preset in the command encoders or programmed into a PROM which is sequentially and cyclically adressed. In either case each command code is then read out serially bit by bit through a sequence and gating logic unit 61 which cyclically gates the commands to a projector driver 62 for the transducer 14. Power for automatically activating the three sections is from a suitable battery 63.

All communications, from either the primary unit 24 on the platform or the diving vessel 10, utilize binary phase encoding techniques of variable sequence length operating at a single center frequency. Any Doppler shift in frequency due to relative motion, as while the diving unit is descending, is compensated as described in copending U.S. applications Ser. Nos. 604,085 and 604,121 filed on Aug. 13, 1975 by Michael G. Winters and Robert C. Flanagan, respectively, now U.s. Pat. Nos. 4,007,330 and 4,007,331, respectively. This method of encoding provides a high degree of link security in terms of both reliable detection of proper codes and rejection of improper codes.

From the foregoing it is evident that an improved acoustic communication system is provided as a secondary system for a hard-wire communications link and includes self-check verification and data read-out upon interrogation and an expendable self-contained acoustic command transmitter that can be launched as a diving unit in the event of occlusion of the primary acoustic propagation path. The advantages of the system include the ability to confirm the primary acoustic signal path integrity on a routine test basis without interrupting operation of the system to be controlled. Also the diving system provides an infinitely superior method of establishing a clear propagation path from a command projector to the receiving hydrohones mounted on the subsea structure in the event of an emergency such as a blowout. However, an early warning of an impending blowout, according to a system to be described, may permit the primary hard-wire communication link or the secondary acoustic communication system to be used to shut down the wellhead.

Figure 7:
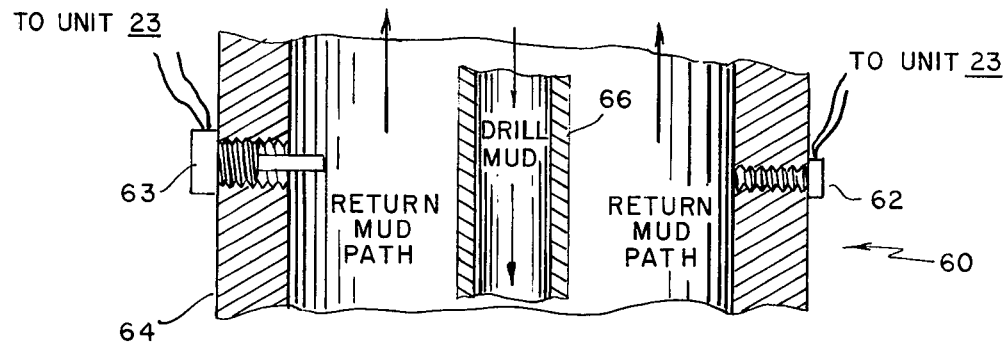
FIG. 7 is a sectional view of a marine riser in the apparatus of FIG. 1.

Referring again to FIG. 1 of the drawings before beginning a description of the early warning system, a marine riser 60 between the drilling platform 22 and the wellhead connects the BOP stack 21 to the platform and provides drill mud (and a return path for the drill mud) for a drilling string 61 below the wellhead. As shown in FIGS. 1 & 7, mud pressure and flow rate sensors 62 and 63 are mounted in the riser through an outer casing 64 which provides the return mud path for the drilling mud being pumped under pressure through an inner casing 66 to the point of entry of a drill bit 68 (FIG. 1)

into the earth. A transducer 70 (FIG. 1) mounted on the well drilling structure receives seismic waves propagated from the point of entry of the drill into the earth. These seismic waves are propagated through a solid path comprised of the earth, the inner and outer casings for the mud, and through other well drilling structure to the sensor, which guarantees high speed seismic wave propagation with a typical velocity of 10,000 to 15,000 feet per second.

When the drill bit 68 enters a high pressure gas pocket 72, the high pressure gas will blow out through the casings 64 and 66, and the wellhead BOP stack 21. The marine riser 66 will usually not hold the high pressure and will part from the wellhead causing great eruption of gas into the water with tremendous turbulence. Such catastrophic blowouts can be prevented if the BOP rams are actuated in time to close off the well. A hard-wire communication link (not shown) between the BOP stack 21 and the drilling platform could be used to command the BOP rams to close, as just noted, but in the event the blowout does develop, the hard-wire link is either deliberately or inadvertently disconnected in an attempt to move the drilling platform out of danger, or broken during initial eruption of escaping gas. That would leave only the diving unit as a reliable communication link. An important aspect of the present invention is therefore to provide advance warning to the drilling operator that a blowout is about to occur, giving him an opportunity to close the BOP rams, through either a hard-wire link, the main acoustic command system or the diving acoustic back-up unit in a more timely manner.

Presently, the operator has available to him only limited parameters to base his decision. He has available drilling mud pressure monitored at the platform end of the drilling string, and in some cases the return mud pressure at the wellhead. He also has the visible condition of the mud return from the marine riser. But these are not very distinct indicators of an impending blowout until the blowout is well in progress. He also has the torque being applied to the drilling string at the platform, but in deep wells this is largely representative of bore resistance rather than drill bit resistance.

To provide early warning, according to the invention, the transducer 70 is used to detect sound or seismic waves propagated from the point of entry of the drill bit into the gas pocket. The propagation media are the earth and the well drilling structure, both of which are solid (earth and metallic) as opposed to water and/or gas. This will guarantee a seismic propagation velocity of 10,000 to 15,000 feet per second. The propagation time between the drill bit and the transducer 70 is therefore significantly shorter than the time required for the emerging high pressure gas to establish a blowout condition above the BOP stack, particularly in deep wells where catastrophic blowouts are most likely to occur.

Figure 8:
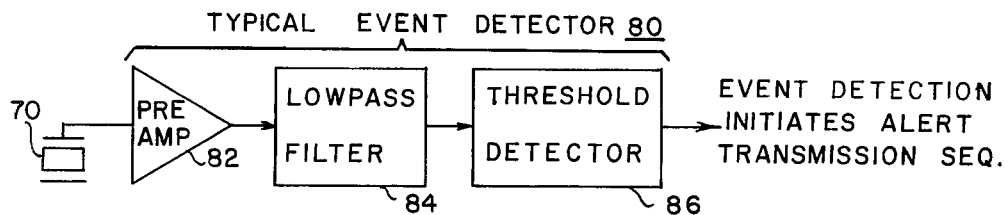
FIG. 8 is a block diagram of a signal conditioning and threshold detector circuit for use in detecting gas blowouts in the system of FIG. 1.

The transducer 70 is connected directly to a signal conditioning and threshold detector circuit 80 shown in FIG. 8 comprised of a preamplifier 82, low-pass filter 84 and threshold detector 86. The detection circuit is frequency and amplitude selective such that nominal drilling noise and vibration would not trigger a false alarm. This can be determined empirically during normal drilling operations at all depths. The detection circuit may be packaged in the transmiter-responder unit 23 (FIG. 1) and connected to transmit an alarm signal directly to the platform via a hard-wire or to transmit a unique phase-shift modulated alert code to the receiver transducer 25 (FIG. 1) suspended in the water just below the platform. In the latter case, detection of the alert code by the control unit 24 trips a special alarm, alerting the operator that a blowout was eminent, providing him with a few seconds to transmit a command to the BOP stack to shut down the wellhead. In either case, a hard-wire communication link would be used as the primary command system to shut down the wellhead, and then for a back-up, the diving acoustic transmission unit would be launched. However, if it is not feasible to use the primary system for whatever reason, the diving back-up unit may be used alone. In some cases the secondary acoustic command system may be used first in place of the primary hard-wired system, but in either case it would be desirable to launch the back-up diving unit after transmitting commands via the primary hard-wire link or the secondary acoustic link as it is inherently more reliable in the event the blowout has already begun out of the wellhead. In that case the black-up diving unit may succeed where the primary and secondary command control system fail.

Figure 9:
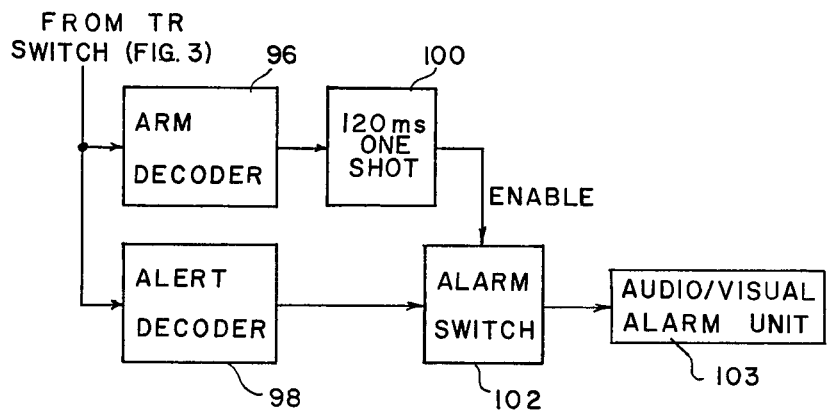
FIG. 9 is a block diagram of an arrangement of decoders for activating an alarm switch in a platform receiver of the system of FIG. 1.

The alert code received and detected by the control unit 24 may be two sequential code words, a first code word used to simply arm the special alarm as indicated in FIG. 9 by an arm decoder 96, and a second code word which detected separately as indicated by an alert decoder 98. The arm decoder triggers a 120 msec one-shot 100 to enable an alarm switch 102 to transmit a signal to an audio/visual alarm unit 103, thus assuring that an alarm is initiated only when the unique arm code is first detected.

Figure 10:
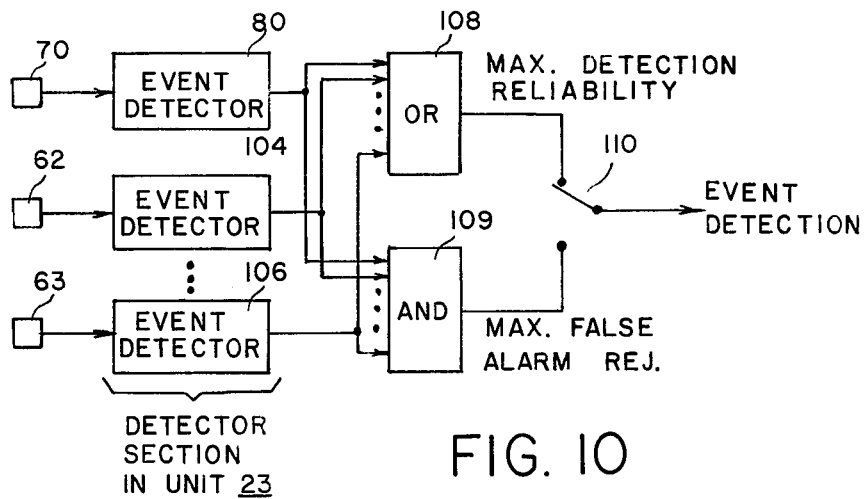
FIG. 10 is a block diagram illustrating variants in the blowout detection system of the present invention.

For greater reliability in detecting an emerging blowout, the mud pressure and flow rate detectors 62 and 63 may be connected to separate channels of a detector section in the underwater receiver transponder unit 23, as shown in FIG. 10, each with its own signal conditioning and threshold detection empirically established. A detector circuit 104 connected to the pressure transducer 62 produces a step function signal in response to detecting the pressure wavefront that would be generated at the point and instance of a blowout. That wavefront travels upward in the return mud path. The threshold detector is set to discriminate against normal mud path pressure fluctuations to preclude false triggering of an alarm. A detector circuit 106 connected to the flow rate sensor 63 is similarly used to sense abnormal mud return velocities resulting from an emerging blowout.

Figure 11:
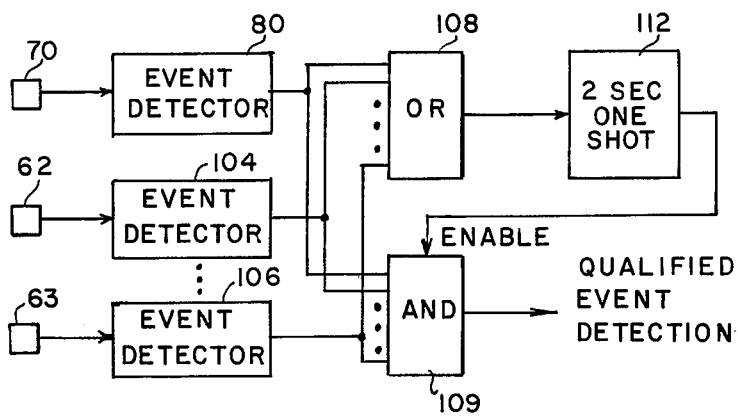
FIG. 11 is a block diagram of another variant.

The detector circuits represented by blocks 80, 104 and 106 in FIG. 10 could be used singularly to provide an early warning blowout system that exploits either the seismic waves, the mud return pressure wave, or the increased flow rate of the mud return, by simply combining them through an OR gate 108, or in combination by combining them through an AND-gate 109 as desired or selected, as by a switch 110. Still another possibility is to AND pairs, such as 80 and 104, and 80 and 106, and to then OR the results of the paired signals, but a preferred arrangement shown in FIG. 11 is to OR all of the detector circuits and trigger a one shot 112 which is then ANDed with all of the detector circuits. This requires all detectors to produce a step function signal within a set time (1 to 3 sec) of the first to do so before an alarm is triggered. This adds to the test of multiple conditions the test of simultaneity. (While three transducers are shown for three separate conditions, fewer or more could obviously be used.) All tests being passed, the alert sequence would then be initiated as described above.

Figure 12:
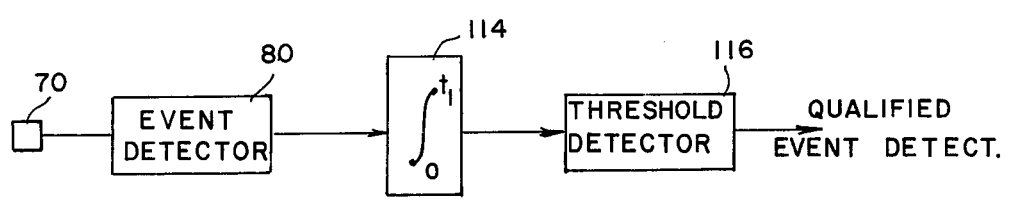
FIG. 12 is a block diagram of still another variant.

Still another possibility for increasing reliability in detecting an emerging blowout condition is to integrate the output of the event detectors over some predetermined time period not exceeding 1 to 3 seconds as shown by an integrator 114 for the detector circuit 80, as shown in FIG. 12. The integrator may be implemented with digital or analog techniques and then threshold detected again by a threshold detector 116 to sound the alarm only after the integrator output exceeds a predetermined level. The output of the second threshold detector may be ORed and ANDed with other signals similarly integrated and threshold detected.

As noted hereinbefore, the early warning blowout (event) detection signal may be transmitted to the control platform over a hard-wire link. That would be the primary communication link to rely upon. However, as a secondary communication link for the event detection signal, the secondary acoustic link could be used from the underwater receiver transponder 23 to the control unit 24 on the platform in the following manner. First it should be understood that the detector section for sensors 70, 62 and 63 would be continuously powered, as in the case of the arm decoders in the underwater receiver-transponder unit.

The event detection signal generated according to the scheme of FIGS. 8, 10, 11 or 12 energizes the projector driver 52 (FIG. 4) via OR gate $G_2$ (FIG. 5) and initiates transmission of an acoustic alert code via an alert encoder 120 (FIG. 4). At that time, the alert encoder disarms the decoder sections 41a and 41b (except the arm decoders) to assure that commands from the control unit do not interfere with transmission of the alert code from the encoder 120. Any other encoder that may be active is interrupted by the priority given an alert code in the sequence and gating logic 49.

The alert encoder includes a 1.1 sec transmit-enable one-shot that is triggered by the event detection step function to disarm the decoder sections 41a and 41b for 1.1 seconds while the alert code is transmitted. At the end of that timing period, the alert encoder is automatically disabled, thereby relinquishing the sequence and gating logic 49 and enabling the decoding sections 41a and 41b. The arm decoders, having been continually enabled, may receive an arm code at any time as the first in a sequence of commands to shut off the wellhead. The other commands are to close the lower pipe ram, close the middle pipe ram and close the shear ram. The last command may be to unlock the riser.

Although a particular embodiment of the invention has been described and illustrated herein, it is recognized that modifications and equivalents may readily occur to those skilled in the art. Consequently, it is intended that the claims be interpreted to cover such modifications and equivalents.

The embodiments of the invention in which an exclusive property or privilege is claimed are described as follows:

1. A method for emergency communication from a control platform comprising the steps of transmitting from a transmitter-receiver through a transducer in the water near said platform an acoustic code to arm a receiver-transponder adjacent said underwater equipment; transmitting from said receiver-transponder an acknowledgement code to said transmitter-receiver via said transducer to indicate that said receiver-transponder is ready to receive acoustic command codes; transmitting one or more acoustic command codes from said transmitter-receiver to said receiver-transponder via said transducer; transmitting from said receiver-transponder acoustic acknowledgement codes for each acoustic command code received, and launching a diving vessel having a transducer and a transmitter preprogrammed to transmit acoustic command codes to said receiver-transponder as said vessel descends through the water, whereby said diving vessel penetrates through any turbulence in the water near said platform that might occlude acoustic communications to water near said underwater equipment that is free of any turbulence for reliable transmission of acoustic communication codes to said receiver-transponder.

2. A method for testing a system for communicating actuate commands to underwater equipment from a transmitter-receiver at the water surface, said commands being communicated through the medium of said water to a receiver-transponder adjacent said underwater equipment, comprising the steps of: transmitting a test code from said transmitter-receiver to said receiver-transponder to prepare said receiver-transponder to receive one or more following actuate commands in a test mode without actuation of equipment in response to actuate codes received; transmitting said one or more following actuate codes to said receiver-transponder from said transmitter receiver; in response to each actuate code received by said receiver-transponder, transmitting from said receiver-transponder to said transmitter-receiver an acknowledgement code; decoding acknowledgement codes received by said transmitter receiver; displaying each acknowledgement code decoded by said transmitter receiver; and transmitting a code from said transmitter-receiver to said receiver-transponder to cancel said test mode.

3. A method as defined in claim 2 wherein said receiver-transponder is normally deactivated except for an arm code detector, and including the step of first transmitting an arm code to enable said receiver-transponder to receiving other following command codes including said test code and one or more actuate codes, wherein said code transmitted from said transmitter-receiver to cancel said test mode is a disarm code which disables said receiver-transponder from receiving and decoding any following codes except said arm code.

4. A method as defined in claim 3 including interrogating said receiver-transponder for data from one or more sensors connected to said receiver-transponder while said receiver-transponder is in said test mode including the step of transmitting from said transmitter-receiver to said receiver-transponder a data interrogate code in place of said one or more actuate codes; and transmitting from said receiver transponder said data in response to receiving and decoding said data interrogate code.

5. A method as defined in claim 4 wherein said receiver-transponder transmits data from a plurality of sensors in a predetermined sequence in response to said data interrogate code, including the steps of multiplexing said sensor data for transmission at said receiver-transponder and demultiplexing said sensor data received by said transmitter-receiver.

6. A method as defined in claim 2 including the steps of detecting an event near said underwater equiment, generating an event detection signal in response to detecting said event, transmitting from said receiver-transponder to said transmitter-receiver an alert code in response to said event detection signal, decoding said alert code at said transmitter-receiver; and generating an alarm signal in response to decoding said alert code.

7. A method as defined in claim 6 including the step of transmitting from said receiver-transponder a unique arm code in response to said event detection signal before transmitting said alert code, and the steps of decoding said unique arm code at said transmitter-receiver, and enabling the generation of said alarm signal in response to decoding said alert code.

8. A method as defined in claim 6 wherein the step of detecting an event includes detecting at least one of a plurality of parameters of said event, and the step of generating an event detection signal is in response to detecting any one of said plurality of parameters detected.

9. A method as defined in claim 6 wherein the step of detecting an event includes detecting a plurality of parameters of said event, and the step of generating an event detection signal is in response to detecting all of said plurality of parameters.

10. A method as defined in claim 6 wherein the step of detecting an event includes detecting a plurality of parameters of said event, and the step of generating an event detection signal is in response to detecting first any one of said plurality of parameters and then all of said plurality of parameters within a predetermined time of detecting said first one.

11. A method as defined in claim 6 wherein the step of detecting an event includes detecting a parameter to generate a proportional signal, integrating said signal in a lossy integrator set to reach a threshold level in a predetermined time span only in the event said signal exceeds said threshold level for a time sufficient for the integrator to reach said threshold.

12. A method for communicating with underwater equipment from the water surface in the event of an emergency comprisng the steps of providing a self-powered transmitter in a vessel, preprogramming said self-powered transmitter to transmit acoustic codes in sequence, and selectively launching said vessel to permit it to free fall through the water toward said equipment while repeatedly transmitting said acoustic codes in sequence.

13. A system for communication between a transmitter-receiver in the vicinity of the surface of a body of water and a receiver-transponder adjacent to equipment near the bottom of a body of water, said transmitter-receiver including means for selectively generating any one of a plurality of unique command codes for transmission from said transmitter-receiver, and a transducer adapted to be immersed in said body of water for transmission of acoustic signals according to said command codes as selected and for receiving acoustic signals from said receiver-transponder, said receiver-transponder including means for receiving acoustic signals and decoding acoustic signal codes received to determine what command has been selected at said transmitter-receiver means responsive to said decoding means for encoding a unique acknowledgement code corresponding to the command code received and decoded to be transmitted to said transmitter-receiver, means for transmitting said acknowledgement code, means for carrying out action called for by the command code thus received and decoded, and means for receiving and decoding each acknowledgement code transmitted from said receiver-transponder, and means for displaying each acknowledgement code received and decoded.

14. A system as defined in claim 13 including a back-up transmitter adapted to be launched as a free falling unit from a position adjacent to said transmitter-receiver, said back-up transmitter having a transducer and means for continually transmitting through said transducer acoustic signals of at least one command code.

15. A system as defined in claim 14 wherein said back-up transmitter is contained in a vessel with said transducer at one end of said vessel, and means for assuring the vessel descends through the water with said one end pointed downward.

16. A system as defined in claim 15 wherein said last named means is comprised of buoyant material in the end of said vessel opposite said one end.

17. A system as defined in claim 16 wherein said vessel in its entirety is buoyant, and said last named means includes a weight tied to said vessel by a lanyard of predetermined length, whereby said vessel floats above the bottom of said body of water with said transducer at said one end free of any plants or debris for continued transmission of acoustic signals.

18. A system as defined in claim 13 wherein said receiver-transponder includes a plurality of actuation means for separately initiating actions commanded by selected command codes transmitted by said transmitter-receiver and decoded by said decoding means of said receiver-transponder, means for disabling said actuation means, means responsive to a unique test code decoded by said decoding means for setting said disabling means, whereby an actuate command transmitted by said transmitter-receiver may be received and decoded without initiating any action while said acknowledgement means responds to said decoding means in encoding an acknowledgement code to be transmitted, and means responsive to a unique code decoded by said decoding means for resetting said disabling means, whereby a self-check verification upon interrogation is provided for any actuate commands selected.

19. A system as defined in claim 18 wherein said decoding means in said receiver-transponder includes means for decoding a unique interrogate data code while said disabling means is set for initiating transmissions of data, and including means for encoding and sequencing data in response to said interrogate data code being decoded.

20. An acoustic communication system for controlling underwater equipment from the water surface, said system comprising
   means for transmitting and receiving encoded acoustic command and control communication signals from said surface,
   means situated at the site of said underwater equipment for receiving encoded acoustic communication signals to initiate operations and for transmitting data in the form of encoded acoustic communication signals in response to encoded communication signals received,
   a vessel adapted to be free diving once it is launched into the water from said surface, and
   a back-up acoustic communication means contained in said vessel for transmitting preprogrammed encoded acoustic communication signals to said underwater site.

21. An acoustic communication system as defined by claim 20 wherein said vessel is elongated and said back-up means includes an acoustic transducer at one end of said vessel, the combination including means remote from said transducer in said vessel to render said vessel buoyant and a weight connected to the transducer end of said vessel by a line of predetermined length to assure that the vessel descends with the transducer end pointed downwardly, and that said vessel float above the floor of the water a distance predetermined by the length of said line with the transducer end pointed downwardly.

22. An acoustic communication system for controlling equipment operating in water comprising remote means for transmitting and receiving encoded acoustic communication signals, said remote means having an acoustic transducer in said water, and underwater means for receiving and decoding acoustic communications signals, and for encoding and transmitting acoustic communications signals, said underwater means including means for decoding acoustic communications signals received as commands, means responsive to said decoding means for initiating operations specified by said signals thus received and decoded, means for encoding a response to be transmitted to acknowledge receipt of a command, and means for transmitting said response, one of said commands being to test an actuation command channel without actuating apparatus of said equipment, and another of said commands being to actuate designated apparatus, said means responsive to said decoding means initiating a test mode of operation in response to said one of said commands in which mode actual operation of said apparatus is inhibited and said response encoding means encodes a test response, whereby actuation commands may be received and decoded by said decoding means and acknowledged by encoding a response through said encoding means without actuation of apparatus, and another one of said commands decoded by said decoding means being to terminate said test mode through said operations initiating means.

23. A system as defined in claim 22 including means for sequencing encoded data to be transmitted automatically, means for initiating said sequencing means in response to an interrogate data command code while said test mode initiated by said means responsive to said decoding means remains in effect, and means for cyclically transmitting data while said test mode remains in effect.

* * * * *